United States Patent Office 3,767,750
Patented Oct. 23, 1973

3,767,750
METAL/GRAPHITE COMPOSITIONS
Aleksander Jerzy Groszek, London, Robert Chalmers Pitkethly, Camberley, and Charles John Geach, Shepperton, England, assignors to The British Petroleum Company, Limited, London, England
No Drawing. Filed Mar. 23, 1971, Ser. No. 127,409
Claims priority, application Great Britain, Mar. 31, 1970, 15,059/70
Int. Cl. B02c *19/12;* H01b *1/04*
U.S. Cl. 264—105      2 Claims

ABSTRACT OF THE DISCLOSURE

Conductive noble/metal graphite compositions useful as electrodes or catalysts are prepared by grinding the metal and graphite together in an organic liquid.

---

This invention relates to mixtures of a finely divided metal and graphite.

It is known to prepare fine dispersions of platinum on graphite by depositing a platinum salt onto the graphite from an aqueous solution, and then decomposing the platinum salt to deposit platinum metal on the graphite.

It is known to prepare oleophilic graphite by grinding graphite in an organic liquid as described in U.K. Pat. 1,168,785.

We have now discovered a method of preparing an intimate mixture of platinum and/or gold or silver with graphite by a grinding process.

According to the invention there is provided a method for preparing a mixture of graphite and gold, silver or platinum by grinding a natural or synthetic graphite together with gold, silver or platinum in an organic grinding liquid till a surface area of at least 5 square metres per gram is attained.

Preferably the grinding takes place entirely below the surface of the organic grinding liquid, and preferably takes place in the substantial absence of air. These conditions can be fulfilled by ensuring that the grinding chamber is substantially full of the organic grinding liquid throughout the grinding process.

The invention also provides mixtures of graphite and gold, silver or platinum prepared by this method.

Satisfactory products can be obtained by grinding in most organic liquids but it is desirable to use one, the bulk of which can be easily removed from the graphite/metal mixture. Those liquids distilling below 500° C. and having a viscosity below 600 centistokes at 100° F. (38° C.) are therefore preferred. (Liquids having a surface tension below 72 dynes/cm., preferably from 10 to 40 dynes/cm., at 25° C. are most preferred.)

Suitable organic liquids are lower molecular weight hydrocarbons, including straight-chain or branched-chain, saturated or unsaturated alkyls, saturated or unsaturated, substituted or unsubstituted, cycloalkyls, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amounts of graphite and metal in the graphite/metal/organic liquid mixture should not exceed 50% wt.; preferably it should be from 2 to 20% wt.

The grinding may be carried out in any suitable grinding mill or device and it is desirable to continue the grinding until a graphite metal mixture having a surface area (as determined by nitrogen adsorption) of from 20 to 800, preferably from 30 to 200, square metres per gram is obtained. Usually this can be achieved by grinding at normal temperatures for the required period but the temperature of the mixture may be artifically increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and graphite. A suitable procedure is to fill the mill with the liquid, add half the balls, then the graphite and metal and finally the rest of the balls.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls.

A magnetic filter can be used to remove small steel particles from the slurry. A circulatory system can also be used wherein the slurry is pumped through an external magnetic filter and then returned to the mill.

A suitable vibratory ball mill is sold under the trade name "Megapact," manufactured by Pilamec Limited. The grinding effect is produced by the impact of the balls upon the graphite and metal and upon each other.

The slurry of graphite and metal can be separated from the balls by sieving or by displacement by another liquid and sieving.

If a relatively high boiling organic liquid is used for grinding it is preferred to displace this liquid by a low boiling liquid. This liquid can then be removed by boiling. It is preferred to use vigorous boiling.

It is also possible to filter the slurry to obtain a filter cake of graphite and metal.

In either case it is preferred to remove the last traces of solvent by heating the filter cake in a vacuum oven for several hours, for example, at 100° C. and at 1 mm. mercury.

When the metal is catalytically active e.g. platinum then the composite will also show catalytic activity. For example the platinum/graphite composite of the present invention will oxidise primary alcohol to aldehydes.

The metal/graphite mixture of the present invention can be compressed to form a solid composite. Preferably the composite contains up to 90% of the metal by weight, more preferably from 1–80% by weight.

The metal/graphite mixture is preferably compressed at a pressure of $2 \times 10^3$ p.s.i., and more preferably at a pressure of 5 to $100 \times 10^3$ p.s.i.

The composites are electrically conductive, and it is a feature of the invention that it enables the preparation of finely-divided platinum, silver or gold on an electrically conductive graphite substrate.

Such composites are useful as electrodes and catalysts for use in electrochemical reactions and for use in electric batteries, accumulators and fuel cells.

The electrical resistivity of the composites is lower in a direction parallel to the axis of compaction than in the direction perpendicular to the axis of compaction. The ratio of these two resistivities can be as high as 10:1.

Preferably the highest resistivity is less than 150 ohm·cm.×$10^{-3}$ and more preferably less than 100 ohm·cm.×$10^{-3}$.

The variation in resistivity is useful in applications where a much greater electrical conductivity is required in one plane than in a plane perpendicular to it e.g. in brushes in electric motors.

The composites of the present invention can also function as solid lubricant bearing materials and can be used as solid lubricants in dispersion in lubricating oils.

The invention will now be described with reference to the examples.

EXAMPLE 1

A mixture of silver and graphite was ground in n-heptane in a vibratory ball mill.

The mill used for the grinding was a vibratory ball mill called by the manufacturer a "Megapact" mill. In the version used the grinding chambers were steel cylinders of 1¼ inch internal diameter by 15 inches long and were nearly filled with ¼ inch diameter steel balls. The mill was fitted with a one-eighth horsepower electric motor and the oscillation could be adjusted from 1 to 5 mm. In operation, each cylinder was filled completely with the n-heptane and the steel balls and 25 to 30 grams of graphite and silver were added. This left about 150 to 200 cc. n-heptane in each cylinder. The ends were then sealed with metal caps fitted with rubber washers to ensure exclusion of air and the grinding was carried out. The grinding was carried out for 8 hours at an amplitude of 4 mm. and a frequency of 3000 r.p.m. After grinding, the contents of the cylinders were placed in sieves which retained the balls and the n-heptane was recovered from them by rapid evaporation.

The silver/graphite compositions were compressed at a pressure of 68×$10^3$ p.s.i. (468×$10^6$ N/m.$^2$) at room temperature and their properties given below in Table 1.

TABLE 1

| Silver in composite, percent wt. | Density at 20° C. g./cc. | Surface area (BET$_2$N ads.) m./g. | Resistivity, ohm.cm.×$10^{-3}$ Parallel to the axis of compaction | Perpendicular to the axis of compaction |
|---|---|---|---|---|
| 20 | 1.90 | 134 | 46 | 4.8 |
| 50 | 2.90 | 82 | 12 | 1.1 |
| 0 | 1.68 |  | 55 | 10.0 |

EXAMPLE 2

A mixture of platinum and graphite was prepared and compressed as in Example 1 replacing the silver by platinum.

The results are shown below in Table 2.

TABLE 2

| Pt in composite, percent wt. | Density at 20° C. g./cc. | Surface area (BET$_2$N ads.) m./g. | Resistivity, ohm.cm.×$10^{-3}$ Parallel to the axis of compaction | Perpendicular to the axis of compaction |
|---|---|---|---|---|
| 0 | 3.68 |  | 55 | 10.0 |
| 3 | 1.64 |  | 60 | 8.4 |
| 20 | 1.96 | 92 | 53 | 9.9 |

The surface area referred to in column 3 of the Tables 1 and 2 refers to the surface area obtained by nitrogen adsorption using the Brunaver, Emett, Teller method.

The composition consisting of 20% platinum and 80% graphite has a strong oxidising action on n-butanol in n-heptane converting the alcohol to the corresponding aldehyde.

The percolation of 2 grams per litre solution of n-butanol through a sample contained in the flow microcalorimeter described on pp. 482–489 of Chemistry and Industry, 20th March 1965, resulted in 7.87 calories per gram of sample being liberated.

Oleophilic graphite gave a corresponding value of below 0.2 calorie per gram.

This result shows that the composites have low resistivity and are catalytically active.

We claim:

1. A method of preparing a mixture of graphite and a metal selected from gold, silver and platinum which comprises grinding graphite and the said metal together in a grinding chamber of a grinding mill, which chamber, throughout the grinding process, is maintained substantially full of an organic grinding liquid of viscosity of below 600 centistokes at 100° F., a surface tension of below 72 dynes/cm. at 25° C. and distilling below 500° C.; continuing the grinding until a surface area of 20 to 800 square metres per gram of the graphite/metal mixture formed, is attained; separating out the graphite/metal mixture formed; and compressing the graphite/metal mixture separated at a pressure of 5 to 100×$10^3$ p.s.i. to form a solid composite.

2. A method as claimed in claim 1 in which the graphite/metal mixture contains from 1 to 80% wt. of the said metal.

References Cited

UNITED STATES PATENTS

| 2,255,120 | 9/1941 | Kieffer et al. | 252—503 X |
| 3,428,541 | 2/1969 | Froemer et al. | 252—503 X |
| 2,985,599 | 5/1961 | Bradley | 252—503 |

FOREIGN PATENTS

| 717,960 | 9/1965 | Canada | 241—30 |
| 1,168,785 | 10/1969 | Great Britain. | |

GEORGE F. LESMES, Primary Examiner

C. E. LIPSEY, Assistant Examiner

U.S. Cl. X.R.

241—30, Dig. 14; 252—503

UNITED STATES PATENT OFFICE
CERTIFICATE OF CORRECTION

Patent No. 3,767,750     Dated October 23, 1974

Inventor(s) Aleksander Jerzy Groszek, Robert Chalmers Pitkethly and Charles John Geach It is certified that error appears in the above-identified patent and that said Letters Patent are hereby corrected as shown below:

Column 2, line 15 "artifically" should be -- artificially --.

Column 4, Table 2, second column from the left "3.68" should be -- 1.68 --.

Signed and sealed this 29th day of October 1974.

(SEAL)
Attest:

McCOY M. GIBSON JR.
Attesting Officer

C. MARSHALL DANN
Commissioner of Patents